United States Patent Office 3,098,884
Patented July 23, 1963

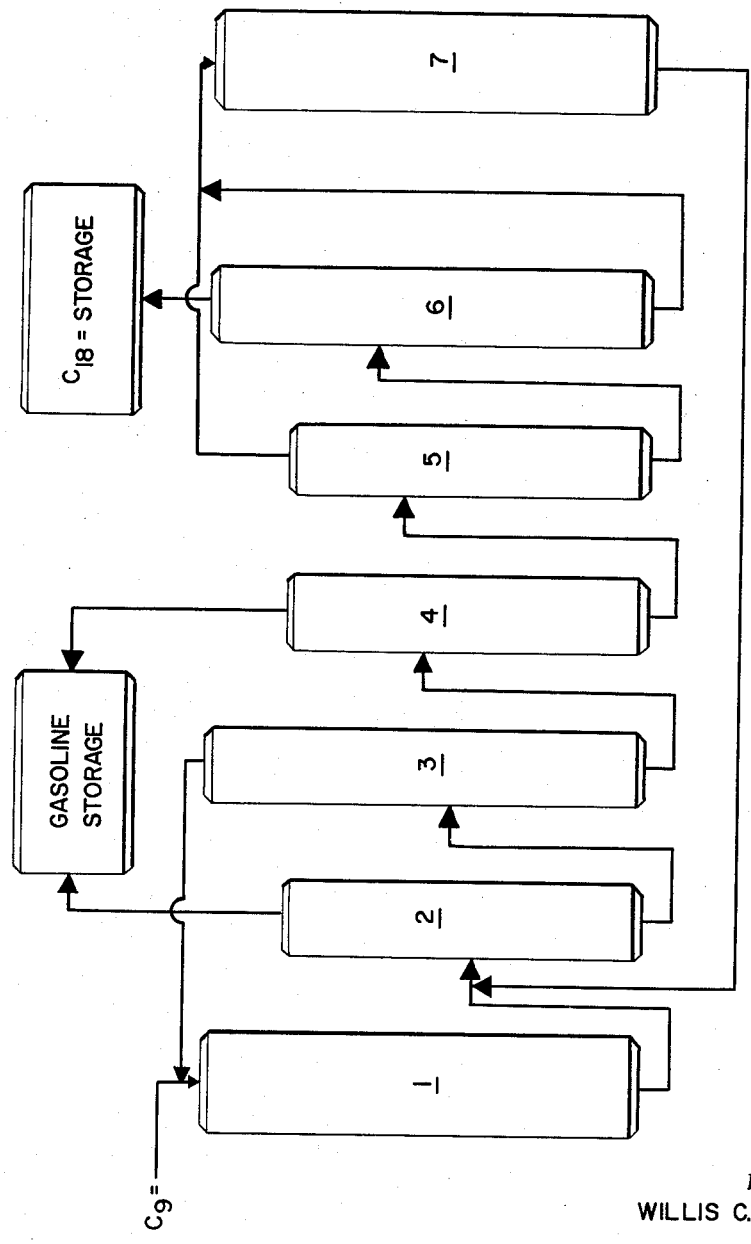

3,098,884
PROCESS FOR PRODUCING OLEFIN POLYMERS
Willis C. Keith, Lansing, Ill., assignor, by mesne assignments, to Sinclair Research, Inc., New York, N.Y., a corporation of Delaware
Filed July 22, 1959, Ser. No. 828,760
7 Claims. (Cl. 260—683.15)

This invention is a process for the manufacture of branched chain unsaturated hydrocarbons from lower molecular weight monoolefins. The process includes the liquid phase dimerization of the monoolefins over an acid solid oxide catalyst, separation of the products and depolymerization of a selected portion to increase the yield of the more desirable materials. The process provides for the conversion of monoolefins produced in large quantities in petroleum refining processes and of limited value, to highly desirable raw materials useful in the production of chemicals, fuel and lubricant additives, detergents, wetting agents and the like.

Polymerization processes previously known to the art, besides yielding the dimer, tend to produce, from monoolefins, a variety of undesirable products due either to the action of the catalyst, to the complexity of the monoolefinic material employed, or to the conditions, such as temperature and pressure, used in the polymerization. Frequently the end products have a wide range of molecular weights due to secondary polymerization reactions. Even processes using catalysts which do not cause extensive rearrangement result in products having a considerable range of molecular weights when the catalysts are used under conditions which lead to polymerization of the initial monoolefin and subsequent repolymerization.

Methods thus far advanced form excessive amounts of undesired products. Various methods have been devised to reduce the undesired products obtained in the attempt to produce the olefin dimer. The tendency to polymerize gaseous monoolefins varies considerably when using different catalysts or with the same catalyst under different conditions. In the use of catalysts the monoolefins either form low molecular weight polymers which cannot be blended to good advantage with natural or light synthetic gasolines or the polymerization products tend to contain hydrocarbons of high-boiling point unsuitable for gasoline.

I have found that the high molecular polymers can be selectively depolymerized to give the mono-olefin, the olefin dimer and a fraction boiling in the gasoline range which is a high octane gasoline. This invention makes a dimerization process more feasible by converting essentially all of the monomer into useful products. In accordance with the present invention mono-olefinic material from 5–12 carbon atoms is dimerized to form mono-olefinic dimers of from 10 to 24 carbon atoms.

The conversion apparatus for the dimerization process will include a reactor and catalyst. The preferred reactor is a fixed bed reactor employing a solid acidic oxide catalyst, such as silica-alumina in bead, extruded or pellet form. Although the fixed bed reactor is preferred, a slurry or other type reactor for instance employing a fluid catalyst may be used. Silica-alumina is the preferred catalyst for the dimerization but other solid oxide catalysts such as silica-magnesia and boria alumina can be used satisfactorily. The oxides are frequently metal oxides calcined to the activated form. The oxides can be of members of groups IIIb, e.g. boria, alumina and gallium oxide; IV, e.g. silica, titania and zirconia, and VIa, e.g. molybdena, or their mixtures. The catalyst will usually be composed of a major amount of silica, alumina or their mixture and may contain either an acidic or basic promoter. The operating temperature for the dimerization reaction for the most part is dependent on the particular feed employed. Usually a temperature in the range of about 200–375° F. is satisfactory and the preferred temperature for the feed, $C_5$ to $C_{12}$ olefins, may be about 250–325° F. The feed rates preferred may be about 0.5 to 2 WHSV, but vary with the temperature and the feed. Satisfactory results can usually be obtained using a range of about 0.1 to 10 WHSV. In general a pressure sufficient to maintain a liquid phase is required and may be atmospheric; this, too, is dependent on the feed and the temperature employed for the polymerization reaction. No advantage has been gained in employing a pressure of over above 1000 p.s.i.g. The aliphatic olefin feed contemplated for the dimerization reaction will be usually a polymer of propylene, butylenes or their copolymers. However, refinery streams containing olefins such as fluid gasoline can also be employed. The usual olefin range will be from about $C_5$ to $C_{12}$ and I prefer little, if any, free oxygen in the reaction zone.

The unexpected improvement over the prior art lies essentially in the depolymerization step where the catalyst is the same as described for the polymerization step, but not necessarily identical in a given operation. Essentially the feed to the depolymerization stage is the material from the polymerization which boils above the desired dimer. Also, I can depolymerize any material boiling between the gasoline range, e.g. above 400 to 425° F. and below the dimer. The depolymerization reaction can be carried out within the range of about 350 to 550° F. in reactor types similar to those used for polymerization. The temperature is dependent somewhat on the polymer to be depolymerized, but no advantage is apparent in going above about 550° F. Usually the depolymerization reaction is carried out at essentially atmospheric hydrocarbon pressure; however, an inert gas such as $N_2$ or $CH_4$ may be used to continually remove volatile components as they are formed. The pressure should be sufficient to maintain a liquid phase, and no advantage has been derived in going to pressures above about 100 p.s.i.g. The feed rate should be low enough to maintain adequate conversion of the feed. Usually a WHSV of about 0.5 to 2 is preferred, however a rate of 0.1 to about 10 will give satisfactory results. The feed rate is dependent on the temperature employed for the depolymerization reaction, and the reaction conditions for depolymerization are more severe than in the polymerization stage.

An illustrative example of this improvement over the prior art is, for example, in the production of $C_{18}$ olefin polymers by dimerizing propylene trimer. In the drawing, the feed passes through a fixed catalyst bed reactor 1 at a rate of about 0.5 to about 2 WHSV and at a temperature of about 200 to a maximum of about 375° F. The effluent is stabilized in atmospheric pressure still 2 to an overhead temperature of about 265° F. to remove material boiling below the $C_9$ olefin range. The overhead from still 2 goes to gasoline storage and the bottoms from still 2 goes to atmospheric pressure still 3 where the unreacted monomer (propylene trimer) is recovered and recycled to the polymerization unit 1. The bottoms from still 3 goes to still 4 where the material boiling above the $C_9$ olefin monomer range and below 400° F. is taken overhead to gasoline storage. The bottoms from still 4 goes to a vacuum distillation tower 5 operated at about 20 mm. Hg absolute. If desired, the material boiling above the gasoline range, above 400° F. at atmospheric pressure, and below the $C_{18}$ olefin range, approximately 285° F. at 20 mm. Hg, is taken overhead and goes to the depolymerization unit 7. The bottoms from still 5 goes to the products still 6 where the $C_{18}$ is taken overhead and goes to storage at up to 330° F. overhead at 20 mm. Hg. The bottoms from still 6 is polymer boiling above the $C_{18}$ olefin range, approximately 330° F. at 20 mm. Hg. This polymer goes to the depolymerization unit 7 along with the overhead from still 5 when the latter is used as depolymerization feedstock. The depolymerization unit is operated at about 350 to 550° F. at a WHSV of about 0.5 to about 2. This unit is operated at essentially atmospheric pressure and the effluent from the depolymerization unit 7 is recycled back to the gasoline still 2. By operating in this manner, essentially all of the feed to the polymerization is converted to the most useful products, i.e., $C_{18}$ olefin and high octane gasoline. The improvement as was stated is the surprising depolymerization selectivity in the regeneration of the monomer, the dimer ($C_{18}$ olefin) and high octane gasoline from the material from the polymerization boiling above the dimer range. Little or no coke or waste gases (light ends) are formed. Modifications of this process can, of course, be used for the production of other olefin dimers to be used as chemical intermediates or for upgrading gasoline.

The need for a selective depolymerization step in order to make a process feasible is illustrated by the following examples.

*Example I*

The reactor was started up and run for a total of 250 hours using nonene (propylene trimer) as feed at various temperatures and feed rates (WHSV). The feed rate varied from 0.75 WHSV to 1.54 WHSV and the temperature was varied from 285 to 375° F. The catalyst used was bead silica alumina, about 12% $Al_2O_3$. The reactor pressure was maintained constant at 200 p.s.i.g., employing nitrogen as the inert gas. During this series of tests the conversion varied from 22 to 50 weight percent and there was no appreciable loss in catalyst activity at the end of 250 hours. The product was composited and on distillation gave the following distribution.

Product: Yield wt. percent
$C_5$'s through $C_8$'s_____ 5
$C_{10}$'s to 400° F_____ 4
400° F. through $C_{17}$'s_____ 11
$C_{18}$ olefin dimer_____ 54
Bottom $C_{18+}$ (mol. ave. wt. 423)_____ 26

It can be readily seen that the above yield is poor and that a yield 37 percent of less desirable products, i.e. other than gasoline and dimers are formed.

*Example II*

This example illustrates that the yield can be improved by employing more desirable conditions.

The same feed (propylene trimer) was used for this example as was used in Example I. Nitrogen pressure of 200 p.s.i.g. was maintained, the feed rate was 1.0 WHSV and the temperature was maintained at 300° F. A conversion of 33 percent was obtained and the product distribution is given below:

Wt. percent
$C_5$'s through $C_8$'s_____ 2.6
$C_{10}$'s to 400° F_____ 3.4
400° F. through $C_{17}$'s_____ 12.0
$C_{18}$ olefin dimer_____ 66.0
Bottom $C_{18+}$_____ 16.0

Although the yield of $C_{18}$ olefin was considerably improved by a better choice of reaction conditions it is evident that a high percentage (28 percent) of the feed was still converted to less desirable products; that is, products other than the dimer that boil above 400° F. and as such cannot be used for gasoline.

*Example III*

The conversion of the less desirable products to more useful products of high value is illustrated by using the depolymerization step. The reactor of the same type and employing the same catalyst as was used in the polymerization step, was used for this example. The feed for this example was the $C_{18+}$ bottoms (mol. wt. 423= $C_{30}$ average) obtained from Example I. The reactor was run at atmospheric pressure, employing a feed rate of 0.9 WHSV. The reactor was controlled at 400° F. After several hours' running a sample of product was collected and fractionated. The following product distribution was obtained:

| Fraction | Product | Wt. Percent |
|---|---|---|
| 1 | High octane gasoline | 19.8 |
| 2 | Monomer ($C_9$=) | 25.2 |
| 3 | 400° F. through $C_{17}$'s (recycle to depolymerization). | 12.0 |
| 4 | $C_{18}$ olefin dimer | 43.0 |
| | | 100.0 |

The conversion of high polymer to products boiling in or below the $C_{18}$ olefin range was 35.6 percent. The selectivity for the depolymerization reaction is surprisingly high and essentially no waste gas or coke were formed. It is of interest to note that 68.2 percent of the high polymer was converted to $C_9$ olefin monomer and $C_{18}$ olefin polymer. In addition, a conversion yield of 19.8 percent to high octane gasoline was obtained. The only less desirable product is the 12 percent boiling above 400° F. and below the desired $C_{18}$ olefin range. This fraction could be recycled back to the depolymerization unit along with unconverted polymer as indicated schematically by FIGURE I.

*Example IV*

This is the same as Example III except that the depolymerization unit was operated at 430° F. A conversion of 43.5 percent was realized at this temperature, and the following product distribution obtained.

Product: Wt. percent
High octane gasoline_____ 26.1
Monomer ($C_9$=)_____ 27.1
400° F. through $C_{17}$'s_____ 13.3
$C_{18}$ olefin dimer_____ 33.5

100.0

This example illustrates when compared with Example III that the higher temperature (430° F. vs 400° F.) is more favorable for the production of gasoline at the expense of the $C_{18}$ olefin dimer.

*Example V*

This example illustrates that the depolymerization reaction can be carried out in a slurry type reactor, employing a finely divided silica-alumina catalyst. This example is also included to illustrate that the high molecular weight polymer can be completely depolymerized to useful products. The feed for this example is the bottoms of $C_{18+}$ unreacted polymer obtained from Examples III and IV. A 295 gram sample of $C_{18+}$ polymer having a molecular weight of 384 (eq. to $C_{27.4}$=) was charged to a stirred reactor along with 25 grams of finely divided catalyst. Nitrogen was passed through the reactor to maintain an inert atmosphere at a rate of 0.26 ft.³/hr.

The reactor was heated very rapidly to 450° F. and this temperature ±10° F. maintained throughout the run. The products were collected in cold water and Dry Ice traps. In order to determine any loss in catalyst activity with time, an additional 25 g. of virgin catalyst was added at the end of four hours. There was no measurable loss in catalyst activity as indicated by the grams of product formed per gram of catalyst per hour. Subsequently an additional 86 grams of polymer was added and the reaction was allowed to continue for an additional hour at 450° F. In order to determine the effect of temperature the reactor temperature was increased to 550° F. From the rate of depolymerization as measured by the grams of product per gram of catalyst per hour, it was concluded that there was no particular advantage in operating at temperatures in this range. The selectivity in depolymerizing high polymer back to the monomer ($C_9=$) or dimer ($C_{18}=$) decreased rapidly when a temperature of about 430° F. was exceeded. The production of high octane gasoline, however, remained very good and no measurable amount of coke or waste gas was produced up to a temperature of 550° F. The products were composited and fractionated. The following distribution of products was obtained from this series of experiments.

| Product: | Wt. percent |
|---|---|
| $C_9=$ | 9.3 |
| $C_{18}=$ | 6.1 |
| Gasoline | 25.4 |
| 400° F. through $C_{17}$'s | 10.6 |
| $C_{18+}$ (average mol wt. 293) | 48.6 |
| | 100.0 |

This data indicates that the more severe depolymerization conditions result in a much higher gasoline yield at the expense of $C_{18}=$. For comparison, refer to Examples III and IV. It should be noted that the $C_{18+}$ material obtained from these depolymerization experiments had a mol. weight of 293 (eq. to $C_{20.9}=$) as compared to the feed for the depolymerization reaction which had a mol. wt. of 384 (eq. to $C_{27.4}=$). The oil was a bright straw-colored material.

Example VI

This example illustrates further the applicability of a selective depolymerization process as illustrated in the previous examples. For this example a mixture of $C_7$ and $C_8$ polygasoline, i.e. propylene-butylene polymer gasoline, was polymerized over a silica-alumina bead catalyst in a fixed bed reactor using a nitrogen pressure of 200 p.s.i.g. The feed rate was 1.28 WHSV and the reaction temperature was 325° F. Employing these conditions a 50.8 weight percent conversion was obtained and the product distribution is given below.

| Component: | Wt. percent |
|---|---|
| Gasoline [1] | 18.0 |
| 400° F. through $C_{13}$ olefin | 8.0 |
| $C_{14}$ olefin | 11.1 |
| $C_{15}$ olefin | 17.4 |
| $C_{16}$ olefin | 15.5 |
| $C_{16+}$ (mol. wt.=342) | 30.0 |
| | 100.0 |

[1] Product boiling below $C_7=$ and above $C_8=$ to 400° F.

In this case the most desired products, the $C_{14}$ to $C_{16}$ olefin dimers, represent only a 44 percent conversion yield. On the other hand, 38 percent of less desirable product was obtained. In this case the fraction boiling above the gasoline range (400° F.) exclusive of the dimer products would go to the depolymerization unit described previously and illustrated by FIGURE I. An additional yield of the most desired products and high octane gasoline would be obtained by recycle operation.

Example VII

Although the polymerization-depolymerization process has been studied for most part in making branched chain olefins as chemical intermediates, it has also been considered as a means of upgrading gasoline by regulating the vapor pressure. In this example a $C_5$ cracked gasoline was polymerized over a silica-alumina catalyst and a nitrogen pressure of 500 p.s.i.g. was maintained. The reaction was run at 1.0 WHSV and a temperature of 300° F. The following distribution of products was obtained.

| Component: | Wt. percent |
|---|---|
| $C_6=$ through $C_9=$ gasoline | 9 |
| $C_{10}$ olefin dimer | 46 |
| $C_{15}$ olefin trimer | 26 |
| $C_{15+}$ (mol. wt.=335) | 19 |

Under these conditions 50 percent of the cracked gasoline was converted to the above products.

The major improvement for upgrading gasoline indicated is in producing a less volatile or lower vapor pressure gasoline, that is, the product, excluding the $C_{15}$ trimer and $C_{15+}$ material. As an example of the value of the $C_{10}=$ fraction for gasoline the following blending values were obtained.

| Micro Octanes | Base Blend | Base Blend + 20% $C_{10}$ dimer |
|---|---|---|
| MM Neat | 80.2 | 80.6 |
| MM+3 cc. TEL | 88.4 | 87.2 |
| Res. Neat | 90.7 | 93.1 |
| Res.+3 cc. TEL | 98.0 | 99.3 |

The following table gives the analysis of the feed for this example along with the analysis of the unreacted gasoline:

| Component | Feed | Unreacted |
|---|---|---|
| $iC_5$ | 26.9 | 51.4 |
| $nC_5$ | 5.9 | 11.9 |
| $C_5=$ | 4.7 | 2.2 |
| 2-Me-Bu-1 | 12.8 | 1.2 |
| $C_5=_2$ | 19.6 | 26.2 |
| 2-Me-Bu-2 | 28.6 | 6.8 |
| Other than $C_5$'s | 1.6 | 0.2 |

It is of interest to note that the branched chain isomers (2-Me-Bu-1 and 2-Me-Bu-2) are selectively removed by polymerization.

When the $C_{10}=$ and $C_{15}=$ are the desired products, then only the $C_{15+}$ material would be subjected to the depolymerization step. If the desired product is gasoline then the $C_{15}$ olefin trimer along with the $C_{15+}$ polymer would be subjected to the depolymerization step to yield high octane gasoline.

Example VIII

When gasoline or the $C_{10}=$ olefin dimer is the desired product, then the conversion yield of these products can be increased. This reaction was run using the same catalyst and feed rate as were employed in Example VII, but the temperature was lowered to 250° C. The following distribution of products was obtained, the conversion in this case was 46.9 percent.

| Component: | Wt. percent |
|---|---|
| $C_6$ to $C_{10}$ gasoline | 15 |
| $C_{10}$ olefin dimer | 56 |
| $C_{15}$ olefin trimer | 20 |
| $C_{15+}$ | 9 |

Here a 71 percent conversion of the polymer to high octane gasoline was obtained. If gasoline is the desired product, then 29 percent ($C_{15}$ olefin trimer+$C_{15+}$ polymer) of the product would be subjected to the depolymerization reaction and recycled through the distillation steps.

Example IX

When the $C_{15}$ olefin trimer is the desired product a substantial yield increase can be obtained by recycling a certain amount of the $C_{10}$ olefin dimer with the cracked gasoline feed. The same catalyst was used for this example as was used for the previous examples (VI through VIII). The feed for this example was 16 percent $C_{10}$ olefin dimer and 84 percent of the $C_5$ fluid gasoline used in the previous examples. The reaction was run at 300° F. employing a WHSV of 1.1. The conversion based on the $C_5$ feed was 35.7 percent. The product distribution based on the $C_5$ feed ($C_{10}$ olefin in feed excluded) was as follows.

| Component: | Wt. percent |
|---|---|
| $C_6$ to $C_{10}$ gasoline | 12 |
| $C_{10}$ olefin dimer | 47 |
| $C_{15}$ olefin trimer | 30 |
| $C_{15+}$ | 11 |

The effect of adding $C_{10}^=$ olefin dimer to the feed gives an improved product distribution for making the $C_{15}^=$ olefin trimer and less high molecular weight ($C_{15+}$) polymer. This is illustrated by comparing the product disbution obtained here with that reported in Example VII. Where the $C_{15}$ olefin trimer is the desired product, then $C_{10}$ olefin dimer would be recycled to the polymerization unit and processed with fresh $C_5$ fluid feed to give the desired copolymer. For the production of the $C_{15}$ copolymer illustrated by this example, it would be advantageous to subject the $C_{15+}$ polymer (11 percent) to the depolymerization step.

I claim:

1. In a process for producing olefin polymers which comprises polymerizing in the liquid phase, monoolefins in the $C_5$–$C_{12}$ range to dimerize the monoolefins by contact with a catalyst consisting essentially of silica-alumina at a temperature of about 200 to 375° F., separating the dimer from the reaction products and depolymerizing in the liquid phase the olefin polymers boiling above said dimer by contact with a catalyst consisting essentially of silica-alumina at a temperature from about 350 to 550° F. substantially all material converted in said depolymerization being transformed into lower boiling liquid material including the dimer and separating the dimer product.

2. The method of claim 1 in which dimer and gasoline are made in both the polymerization and depolymerization.

3. The process in claim 1 in which the monoolefin is propylene trimer.

4. The process of claim 1 in which the depolymerization temperature is about 350 to 430° F.

5. A process for producing olefin polymers which comprises polymerizing in the liquid phase, monoolefins in the $C_5$–$C_{12}$ range to dimerize the monoolefins by contact with a catalyst consisting essentially of silica-alumina at a temperature of about 200 to 375° F., separating the dimer and gasoline from the reaction products and depolymerizing the material boiling above the gasoline range and below the dimer range, and the olefinic polymers boiling above said dimer by contact with a catalyst consisting essentially of silica-alumina at a temperature from about 350 to 550° F. substantially all material converted in said depolymerization being transformed into lower boiling liquid material including the dimer and separating the product into gasoline and the dimer.

6. The process in claim 5 in which the monolefin is propylene trimer and the dimer is $C_{18}$ olefin.

7. The process of claim 5 in which the depolymerization temperature is about 350 to 430° F.

References Cited in the file of this patent

UNITED STATES PATENTS

| | | |
|---|---|---|
| 2,409,727 | Bailey | Oct. 22, 1946 |
| 2,431,454 | Berk et al. | Nov. 25, 1947 |
| 2,552,692 | Schulze et al. | May 15, 1951 |

OTHER REFERENCES

Johnson et al.: Jour. Amer. Chem. Soc., vol. 68, 1946, pages 1416–1419.

Johnson: Jour. Amer. Chem. Soc., vol. 69, 1947, pages 146–149.